United States Patent [19]

Kamiyama et al.

[11] Patent Number: 4,619,767

[45] Date of Patent: Oct. 28, 1986

[54] COMPOSITE SEMIPERMEABLE MEMBRANE

[75] Inventors: Yoshiyasu Kamiyama; Noriaki Yoshioka; Keisuke Nakagome, all of Osaka, Japan

[73] Assignee: Nitto Electric Industrial Co., Ltd., Osaka, Japan

[21] Appl. No.: 287,653

[22] Filed: Jul. 28, 1981

[30] Foreign Application Priority Data

Jul. 28, 1980 [JP] Japan ................................. 55-103291

[51] Int. Cl.$^4$ ............................................. B01D 13/00
[52] U.S. Cl. ................................. 210/490; 210/500.42
[58] Field of Search ...................... 210/490, 491, 500.2, 210/654

[56] References Cited

U.S. PATENT DOCUMENTS 3,951,815  4/1976  Wrasidlo ........................... 210/500.2
4,337,154  6/1982  Fukuchi et al. ...................... 210/490

Primary Examiner—Frank Spear
Attorney, Agent, or Firm—Sughrue, Mion, Zinn, Macpeak, and Seas

[57] ABSTRACT

A composite semipermeable membrane is described, wherein said membrane comprises (1) a porous substrate, (2) an ultrathin film as a surface layer formed by polymerization by crosslinking of polyvinyl alcohol and an amino compound having at least two secondary amino groups using a polyfunctional crosslinking reagent capable of reacting with secondary amino groups and hydroxyl groups, and (3) a porous inner layer composed of water insoluble polyvinyl alcohol which is present between the porous substrate and the ultrathin film.

10 Claims, No Drawings

COMPOSITE SEMIPERMEABLE MEMBRANE

FIELD OF THE INVENTION

The present invention relates to a composite semipermeable membrane and a process for preparation thereof.

BACKGROUND OF THE INVENTION

Recently, various composite semipermeable membranes wherein a semipermeable ultrathin film is formed on a porous substrate have been proposed as semipermeable membranes for reverse osmosis or ultrafiltration. For example, a composite semipermeable membrane wherein a dense ultrathin film composed of polyethyleneimine crosslinked by a polyfunctional crosslinking reagent such as isophthaloyl chloride is formed on a porous substrate has been disclosed in U.S. Pat. No. 4,039,440. However, this composite semipermeable membrane is insufficient in oxidation resistance, particularly, in chlorine resistance, and there are disadvantages, in the case of the solution to be processed being sterilized, that the processing system is generally complicated and the processing costs become high because of the requirement for a dechlorination step prior to the membrane processing step. On the other hand, a composite semipermeable membrane wherein an ultrathin film composed of ethylenediamine modified polyepichlorohydrin crosslinked with the same crosslinking reagent as described above is formed on a porous substrate to improve chlorine resistance has been disclosed in U.S. Pat. No. 4,005,012. However, this composite semipermeable membrane has a problem in practical use because the chlorine resistance is only slightly improved as compared to U.S. Pat. No. 4,039,440, and the water permeability is small. Likewise, it has been disclosed in U.S. Pat. No. 3,951,815 that a semipermeable ultrathin film can be formed by crosslinking polyvinyl alcohol with a crosslinking reagent such as isophthaloyl chloride. However, this composite semipermeable membrane has a fault in practical use that the chlorine resistance is also slightly improved and the water permeability is small.

Further, the above described semipermeable membranes are not suitable for use in carrying out desalting of aqueous solutions of salts having a low osmotic pressure, such as brackish water or industrial water, etc., because useful performance of such membranes is only exhibited in the case of operating under a high operation pressure of at least 40 kg/cm². That is, many of the known composite semipermeable membranes do not have a practically suitable water permeability, viz., at least as high as 0.5 m³/m²·day under a low pressure operating condition of from 10 to 15 kg/cm².

On the other hand, composite membranes prepared by coating a porous substrate with amino compound monomers, such as phenylenediamine, piperazine, etc., and thereafter crosslinking with an aldehyde or diacyl chloride, have been disclosed in *Office of Saline Water Research and Development Progress Report*, PB-253193 (1976) and PB-288387 (1978). However, these membranes are not satisfactory from the viewpoint of water permeability, even though certain kinds of piperazine-acid chloride composite membranes are comparatively excellent in chlorine resistance and show a comparatively excellent performance under low pressure operating conditions. Also, it is difficult to completely cover fine pores on the substrate with the crosslinked polymer layer, because the amino compound monomer is applied to the porous substrate and thereafter it is polymerized by crosslinking. Consequently, membrane defects are easily caused, and composite semipermeable membranes having good reproducibility and performance are difficult to prepare.

SUMMARY OF THE INVENTION

The present invention has been accomplished in order to overcome the above described various problems of heretofore known composite semipermeable membranes, and it is an object of the present invention to provide a composite semipermeable membrane having particularly excellent oxidation resistance and highly selective separation properties in addition to large water permeability under low pressure operating conditions, and a process for preparation thereof.

The composite semipermeable membrane according to this invention comprises (1) a porous substrate, (2) an ultrathin film as a surface layer formed by polymerization by crosslinking of polyvinyl alcohol and an amino compound having at least two secondary amino groups using a polyfunctional crosslinking reagent capable of reacting with secondary amino groups and hydroxyl groups, and (3) a porous inner layer composed of water insoluble polyvinyl alcohol which is present between the porous substrate (1) and the ultrathin film (2).

This composite semipermeable membrane is prepared according to a process of the present invention which comprises coating or impregnating a porous substrate with an aqueous solution containing polyvinyl alcohol and an amino compound having at least 2 secondary amino groups in the molecule, thereafter contacting the porous substrate with a polyfunctional crosslinking reagent capable of reacting with secondary amino groups and hydroxyl groups to polymerize the polyvinyl alcohol and the amino compound by crosslinking, and then heating the product.

DETAILED DESCRIPTION OF THE INVENTION

The polyvinyl alcohol used in the present invention is a water soluble polymer preferably having a saponification value of from 87 to 99 mole% and a degree of polymerization of from 300 to 3000. Such polymers are commercially available, e.g., Poval 224, a product of Kuraray Co. In the present invention, polyvinyl alcohol having a degree of polymerization of more than 1000 is not suitably used, although the degree of polymerization is not critical.

The amino compound used in the present invention is an aliphatic, alicyclic, aromatic, or heteroaromatic compound having at least 2 secondary amino groups in the molecule which has a water solubility of at least 0.1% by weight at room temperature (e.g., about 15° to 35° C.) and a weight loss of 50% or more when heated to 130° C. for 30 minutes. The weight loss is measured by an evaporation test. The weight loss representation is a factor showing removal of unreacted compounds from the porous inner layer. As such amino compounds, there are, for example, compounds represented by formula (I)

$$R^1\text{—NH—A—NH—}R^2 \qquad (I)$$

wherein A represents an alkylene group having from 2 to 8 carbon atoms, a divalent alicyclic group, a divalent aromatic group, or a divalent heteroaromatic group, and R¹ and R² each represents an alkyl group having from 1 to 3 carbon atoms;
compounds represented by formula (II)

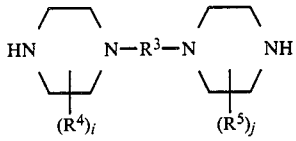

wherein R³ represents an alkylene group having from 0 to 4 carbon atoms, R⁴ and R⁵ each represents an alkyl group having from 1 to 3 carbon atoms, and i and j each represents an integer of 0 to 4;
compounds represented by formula (III)

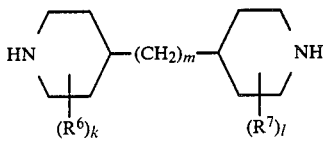

wherein R⁶ and R⁷ each represents an alkyl group having from 1 to 3 carbon atoms, k and l each represents an integer of 0 to 4, and m represents an integer of 0 to 4; and
compounds represented by formula (IV)

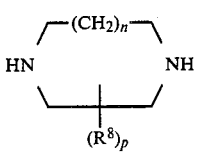

wherein R⁸ represents an alkyl group having from 1 to 3 carbon atoms, n represents 1 or 2, and p represents an integer of 0 to 4.

Preferred examples thereof include: N,N'-dimethylethylenediamine, N,N'-dimethylpropylenediamine, N,N'-dimethyl-m-phenylenediamine, N,N'-dimethyl-p-phenylenediamine, 2,6-dimethylaminopyridine, etc., according to formula (I);

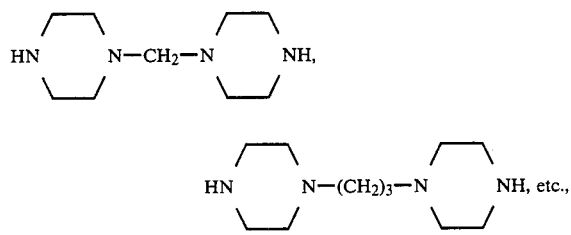

according to formula (II);

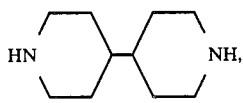

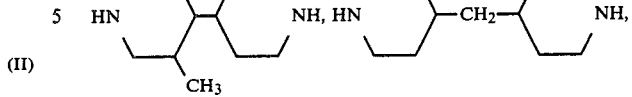

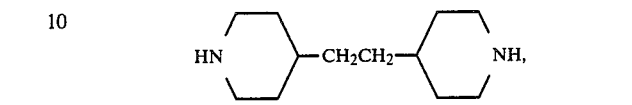

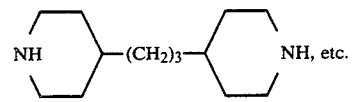

according to formula (III); and piperazine, 2-methylpiperazine, 2,5-dimethylpiperazine, homopiperazine (hexahydrodiazepine), etc., according to formula (IV). These amino compounds can be used alone or as a mixture of two or more thereof.

In the composite semipermeable membrane of the present invention, polyvinyl alcohol and an amino compound as described above are crosslinked using a polyfunctional crosslinking agent to form a semipermeable dense ultrathin film on a porous substrate. Such an ultrathin film is prepared by coating or impregnating the porous substrate with a solution of polyvinyl alcohol and the amino compound, and thereafter contacting the substrate with a polyfunctional crosslinking reagent to polymerize them by crosslinking.

As a solvent for producing a solution of the mixture of polyvinyl alcohol and the amino compound (referred to as the "raw solution" hereinafter), water is suitably used. The raw solution is prepared such that the amino compound is contained therein in an amount of from 10 to 500 parts by weight, and preferably from 20 to 300 parts by weight, based on 100 parts by weight of polyvinyl alcohol, and the total content of the polyvinyl alcohol and the amino compound is from 0.05 to 10% by weight, and preferably from 0.1 to 5% by weight. This raw solution may contain a surface active agent for reducing surface tension in the case of coating or impregnating the porous substrate. Further, it may contain a reagent for neutralizing by-products, for example, bases such as sodium hydroxide, aqueous ammonia or sodium phosphate, etc., in the case by-products such as hydrochloric acid are produced during crosslinking with the crosslinking reagent.

The porous substrate used in the present invention is suitably a membrane having an asymmetric structure wherein the surface pore size is generally from 50 to 5000 Å and the pure water flux after operation for 1 hour under a pressure of 3.5 kg/cm² (referred to as the membrane constant hereinafter) is at least $10^{-5}$ g/cm²-second-atmosphere, and preferably from $10^{-4}$ to 0.1 g/cm²-second-atmosphere. For example, polysulfone, polyacrylonitrile, cellulose ester, polypropylene and polyvinyl chloride can preferably be used. Particularly, polysulfone is preferable. The porous membrane may be reinforced by backing with cloth or a nonwoven web.

The amount of the raw solution containing the polyvinyl alcohol and the amino compound applied to the porous substrate should be sufficient to provide from 0.05 to 5 g/cm², and preferably from 0.1 to 1 g/m², calculated as solid content. If necessary, the amount of coating is controlled so as to be in the above described range by air drying or draining after application of the raw solution to the substrate.

Various conventional coating methods can be employed in this invention. The typical method is that the raw solution is poured onto the porous substrate and then drained.

The polyfunctional crosslinking reagent used in the present invention is a compound having 2 or more functional groups capable of reacting with secondary amino groups and hydroxyl groups, for example, one or more kinds of acid halide groups, halogen sulfonyl groups, N-haloformyl groups, haloformate groups and acid anhydride groups, etc., in the molecule. Preferred examples include isophthaloyl chloride, terephthaloyl chloride, trimesic acid chloride, trimellitic acid chloride, trimellitic acid chloride anhydride, 1,3-dichlorosulfonyl benzene, picolinic acid chloride, 5-chlorosulfonyl isophthaloyl chloride, and piperazine-N,N-dicarboxylic acid dichloride. Trimesic acid chloride, trimellitic acid chloride, and isophthaloyl chloride are particularly preferable.

The process for contacting the coated layer of the raw solution containing the polyvinyl alcohol and the amino compound with the above described polyfunctional crosslinking reagent can comprise dissolving the crosslinking reagent in an organic solvent which is substantially immiscible with the solvent for preparing the above described raw solution, and contacting the coated layer with the resulting crosslinking reagent solution, or the process can comprise contacting the coated layer with a vapor of the crosslinking reagent.

In the process which comprises contacting the coated layer with the crosslinking reagent solution, it is necessary that the solvent for the crosslinking reagent does not dissolve and swell the porous substrate. Preferably, hydrocarbon solvents having a solubility parameter of 7.0 to 9.0 are used. Preferably, aliphatic and alicyclic hydrocarbons having from 5 to 8 carbon atoms are used, examples of which include pentane, hexane, heptane, octane, cyclopentane, cyclohexane, petroleum ether, etc. In addition, trichlorotrifluoroethane is a suitable solvent. The crosslinking reagent solution generally has a concentration of from 0.05 to 10% by weight and, preferably 0.1 to 5% by weight. The temperature and time of contacting with the raw solution coated layer can vary, according to the kind and concentration of the crosslinking reagent, the concentration of the raw solution, and the kind of the amino compound monomer, etc., but contacting is generally carried out at from 10° C. to 60° C., for example, for from 10 seconds to 10 minutes, and preferably from 30 seconds to 5 minutes, at room temperature.

In the case of using the vapor of the crosslinking reagent, the vapor pressure of the crosslinking reagent in the vapor atmosphere is generally at least 0.1 mmHg, and preferably, at least 0.2 mmHg at a temperature of 100° C. or less, though it depends upon the kind of the crosslinking reagent to be used and the contacting temperature. The contacting temperature is generally from 5° C. to 90° C., and preferably from 20° C. to 70° C., and the contacting time is from 0.1 seconds to 30 minutes, and preferably from 1 second to 5 minutes.

In order to carry out the crosslinking effectively to obtain a composite semipermeable membrane having good performance, the contacting time and the vapor pressure are preferably selected such that the value of "P log T" wherein P (mm Hg) is the vapor pressure of the crosslinking reagent at the contacting temperature and T is the contacting time (second), is preferably at least 0.1 and, particularly at least 0.3. There is no upper limit required for the "P log T" values, but it is generally 1000 or less.

Further, gases which do not participate in the crosslinking reaction, such as air, nitrogen, carbon dioxide, freon gas, or an inert gas, etc., may be present in the case of contacting the raw solution coated layer with the vapor of the crosslinking reagent.

In the present invention, since the raw solution coated layer on the porous substrate is brought into contact with the crosslinking reagent solution which is substantially immiscible with the raw solution or with the vapor of the crosslinking reagent, crosslinking of the polyvinyl alcohol and the amino compound with the crosslinking reagent is carried out by interfacial polymerization at the surface layer of the raw solution coating layer, by which a semipermeable dense ultrathin film is formed as a surface layer. The thickness of the dense ultrathin film, which depends upon the concentrations of the polyvinyl alcohol and the amino compound in the raw solution and the contacting time with the crosslinking reagent, is generally from 50 to 800 Å, and preferably from 100 to 500 Å. If the ultrathin film is too thin, partial defects are caused on the film surface. On the other hand, if it is too thick, the water permeability deteriorates.

The porous substrate, coated or impregnated with the raw solution and thereafter brought into contact with the crosslinking reagent, as described above, is then subjected to heat treatment. This heat treatment is carried out for the purpose of simultaneously completing the crosslinking of the polyvinyl alcohol and the amino compound with the crosslinking reagent in the ultrathin film, while insolubilizing (in water) the unreacted polyvinyl alcohol which does not react in the crosslinking reaction in the inner part of the raw solution coating layer, i.e., between the ultrathin film and the porous substrate, and volatilizing the unreacted amino compound at the same time from the inner part of the raw solution coating layer. Accordingly, the heating temperature is chosen such that the polyvinyl alcohol is insolubilized and the greater part (at least about 50 wt%) of the amino compound is volatilized. Generally, it is from 80° to 180° C., and preferably from 100° to 150° C. The heating time is from 1 to 60 minutes, and preferably from 5 to 30 minutes. As a result of such heat treatment, the composite semipermeable membrane formed has a very large water permeability as compared with previously known composite semipermeable membranes because the unreacted amino compound is volatilized to form many fine pores in the water-insoluble polyvinyl alcohol inner layer and the ultrathin film is supported on this porous polyvinyl alcohol layer.

Further according to the present invention, since the amino compound having secondary amino groups reacts with polyvinyl alcohol and/or the crosslinking reagent to form crosslinkages, the membrane does not contain active hydrogen, such as hydrogen of imino groups, and, consequently, it has high oxidation resistance, and particularly high chlorine resistance.

Moreover, the composite semipermeable membrane of the present invention has not only excellent water permeability under low operating pressure, but also excellent selective separation ability. Accordingly, it can be utilized for various uses, such as for desalting of brackish water, in the food industry, for treatment of waste water, for separation of oils and water, etc. From the viewpoint of preparation, the solution of the polyvinyl alcohol and the amino compound can be uniformly applied to the porous substrate because it has a suitable high viscosity, and, consequently, fine pores on the substrate can be completely covered by subjecting the polyvinyl alcohol and the amino compound to crosslinking polymerization to form a uniform ultrathin film. As a result, it is possible to always prepare a composite semipermeable membrane having definite membrane properties.

Below, the present invention is illustrated by reference to examples. However, the present invention is not limited thereto. In the examples, "rejection" means a value calculated by the following formula $$\text{Rejection (\%)} = \left(1 - \frac{\text{Salt concentration in permeated solution}}{\text{Salt concentration in feed solution}}\right) \times 100$$

EXAMPLE 1

After a porous membrane substrate composed of polysulfone (P-3500, produced by Union Carbide Co.) was uniformly coated with an aqueous solution containing 0.25% by weight of polyvinyl alcohol (Poval 224, produced by Kuraray Co.), 0.25% by weight of N,N'-dimethylethylenediamine and 0.5% by weight of sodium hydroxide, it was immersed in a 1 wt% solution of trimesic acid chloride in n-hexane at 25° C. for 1 minute. After this, the substrate was taken out to volatilize the n-hexane, and the membrane was subjected to heat treatment at 110° C. for 10 minutes in air.

The resulting composite semipermeable membrane was tested in a reverse osmosis test by supplying a 5000 ppm aqueous solution of magnesium sulfate at a temperature of 25° C. under a pressure of 14 kg/cm$^2$ to the ultrathin film side of the membranes. The water flux after 24 hours was 1.01 m$^3$/m$^2$·day and the rejection was 90.0%. When continuous operation was carried out subsequently for 150 hours, the performance of the membrane did not deteriorate.

EXAMPLES 2-6

Composite semipermeable membranes were obtained by the same procedure as in Example 1, except that the amino compounds shown in Table 1 below were used instead of N,N'-dimethylethylenediamine. The reverse osmosis performance of these composite semipermeable membranes were measured under the same conditions as in Example 1, and the results are shown in Table 1.

TABLE 1

| Example | Amino Compound | Water Flux (m$^3$/m$^2$ · day) | Rejection (%) |
|---|---|---|---|
| 2 | Homopiperazine* | 1.11 | 97.9 |
| 3 | Piperazine | 1.20 | 99.0 |
| 4 | 2,5-Dimethylpiperazine | 1.03 | 98.1 |
| 5 | N,N'—Dimethyl-m-phenylenediamine | 0.85 | 98.3 |
| 6 | 1,3-Dipiperazylpropane | 0.80 | 98.3 |

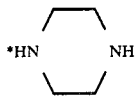

*HN   NH

EXAMPLES 7-9

Composite semipermeable membranes were obtained by the same procedure as in Example 1, except that a 1 wt% solution of the crosslinking reagent shown in Table 2 in n-hexane was used as a crosslinking reagent solution instead of the solution of trimesic acid chloride, and piperazine was used as the amino compound instead of N,N'-dimethylethylenediamine. The reverse osmosis performance of these composite semipermeable membranes was measured under the same conditions as in Example 1, and the results are shown in Table 2.

TABLE 2

| Example | Crosslinking Reagent | Water Flux (m$^3$/m$^2$ · day) | Rejection (%) |
|---|---|---|---|
| 7 | Isophthaloyl chloride | 0.93 | 98.8 |
| 8 | Isophthaloyl chloride/benzene-m-disulfonic acid chloride (3/1) | 0.99 | 97.8 |
| 9 | Isophthaloyl chloride/trimesic acid chloride (3/1) | 1.23 | 98.9 |

EXAMPLE 10

A composite semipermeable membrane was obtained by the same procedure as in Example 1 except that the substrate after being coated with the raw solution was brought into contact with isophthaloyl chloride vapor under conditions such that the "P log T" value was 0.4. When the reverse osmosis performance of this composite semipermeable membrane was measured under the same conditions as in Example 1, the water flux was 0.87 m$^3$/m$^2$·day, and the rejection was 98.1%.

EXAMPLE 11

The composite semipermeable membrane obtained in Example 3 was immersed in a 100 ppm aqueous solution of chlorine having a pH of 11.3 at a room temperature for 3 days. The reverse osmosis performance before immersion and after immersion was evaluated. The composite semipermeable membrane before immersion showed a water flux of 1.25 m$^3$/m$^2$·day and a rejection of 98.9%, and after immersion showed a water flux of 1.25 m$^3$/m$^2$·day and a rejection of 98.7%. Accordingly, the chlorine resistance was excellent.

EXAMPLE 12

The reverse osmosis performance of the composite semipermeable membrane obtained in Example 3 was measured by varying the operating pressure of an aqueous solution of magnesium sulfate, an aqueous solution of sodium chloride or an aqueous solution of sucrose, and the results are shown in Table 3, from which it is obvious that the composite semipermeable membrane has a high selective separation property for inorganic salts.

TABLE 3

| Aqueous Solution of Inorganic Salt | Operating Pressure (kg/cm$^2$) | Water Flux (m$^3$/m$^2$ · day) | Rejection (%) |
|---|---|---|---|
| 5000 ppm MgSO$_4$ | 14 | 1.25 | 99.0 |
| 1000 ppm MgSO$_4$ | 14 | 1.28 | 99.2 |
| 5000 ppm NaCl | 14 | 1.96 | 26.0 |
| 5000 ppm MgSO$_4$ | 42 | 3.86 | 99.5 |
| 5000 ppm NaCl | 42 | 5.60 | 64.0 |
| 5000 ppm Sucrose | 14 | 1.87 | 99.5 |

COMPARATIVE EXAMPLE 1

A composite semipermeable membrane was obtained using an aqueous solution containing 1% by weight of polyvinyl alcohol and 1% by weight of sodium hydroxide as a raw solution, and which did not contain an amino compound, by processing with a solution of trimesic acid chloride and heating by the same procedure as in Example 1. When the reverse osmosis performance of this composite semipermeable membrane was measured under the same conditions as in Example 1, the water flux was 0.86 m³/m²·day and the rejection was 49.3%.

COMPARATIVE EXAMPLE 2

A composite semipermeable membrane was obtained using an aqueous solution containing 1% by weight of piperazine and 1% by weight of sodium hydroxide as a raw solution, by processing with a solution of trimesic acid chloride and heating by the same procedure as in Example 1. When the reverse osmosis performance of this composite semipermeable membrane was measured under the same conditions as in Example 1, the water flux was 0.65 m³/m²·day and the rejection was 98.1%.

While the invention has been described in detail and with reference to specific embodiment thereof, it will be apparent to one skilled in the art that various changes and modifications can be made therein without departing from the spirit and scope thereof.

What is claimed is:

1. A composite semipermeable membrane comprising (1) a porous substrate, (2) an ultrathin film as a surface layer formed by polymerization by crosslinking of polyvinyl alcohol and an amino compound having at least two secondary amino groups using a polyfunctional crosslinking reagent capable of reacting with secondary amino groups and hydroxyl groups, and (3) a porous inner layer composed of water-insoluble polyvinyl alcohol which is present between the porous substrate and the ultrathin layer.

2. A composite semipermeable membrane according to claim 1 wherein said amino compound is represented by formula (I)

$$R^1-NH-A-NH-R^2 \quad (I)$$

wherein A represents an alkylene group having from 2 to 8 carbon atoms, a divalent alicyclic group, a divalent aromatic group, or a divalent heteroaromatic group, and $R^1$ and $R^2$ each represents an alkyl group having from 1 to 3 carbon atoms.

3. A composite semipermeable membrane according to claim 1 wherein said amino compound is represented by formula (II)

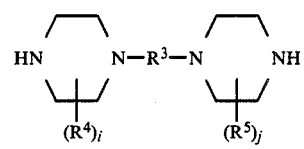

wherein $R^3$ represents an alkylene group having from 0 to 4 carbon atoms, $R^4$ and $R^5$ each represents an alkyl group having from 1 to 3 carbon atoms, and i and j each represents an integer of 0 to 4.

4. A composite semipermeable membrane according to claim 1 wherein said amino compound is represented by formula (III)

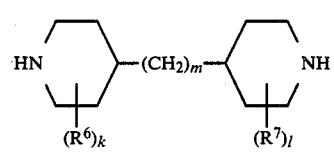

wherein $R^6$ and $R^7$ each represents an alkyl group having from 1 to 3 carbon atoms, k and l each represents an integer of 0 to 4, and m represents an integer of 0 to 4.

5. A composite semipermeable membrane according to claim 1 wherein said amino compound is represented by formula (IV)

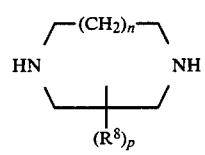

wherein $R^8$ represents an alkyl group having from 1 to 3 carbon atoms, n represents 1 or 2, and p represents an integer of 0 to 4.

6. A composite semipermeable membrane according to claim 1, 2, 3, 4, or 5, wherein said polyfunctional crosslinking reagent has 2 or more functional groups selected from acid halide groups, N-haloformyl groups, haloformate groups, halogen sulfonyl groups and acid anhydride groups.

7. A composite semipermeable membrane according to claim 1, 2, 3, 4, or 5, wherein said porous substrate is composed of polysulfone, polyacrylonitrile, cellulose ester, polypropylene or polyvinyl chloride.

8. A composite semipermeable membrane according to claim 1, 2, 3, 4, or 5, wherein the porous substrate has a surface pore size of from 50 to 500 Å and has a pure water flux of at least $10^{-5}$ g/cm²-second-atmosphere after operation for one hour under a pressure of 3.5 kg/cm².

9. A composite semipermeable membrane according to claim 1, wherein said polyvinyl alcohol is a water soluble polymer having a saponification value of from 87 to 99 mole % and a degree of polymerization of from 300 to 3000.

10. A composite semipermeable membrane according to claim 9, wherein said ultrathin film has a thickness of from 50 to 800 Å.

* * * * *